United States Patent [19]
Smith et al.

[11] Patent Number: 5,287,904
[45] Date of Patent: Feb. 22, 1994

[54] HAIL INHIBITING BLANKET

[76] Inventors: David W. Smith, NBU 4A #2 Unit 23, Kirtland, N. Mex. 87411; Thomas C. Street, 3109 Northridge Dr., Farmington, N. Mex. 87401

[21] Appl. No.: 58,582

[22] Filed: Jun. 18, 1993

[51] Int. Cl.⁵ .............................................. B65D 65/02
[52] U.S. Cl. ...................................... 150/166; 206/522
[58] Field of Search ................... 150/154, 166; 383/3; 206/522, 521

[56] References Cited

U.S. PATENT DOCUMENTS

| | | | |
|---|---|---|---|
| 3,340,669 | 9/1967 | Farguharson | 206/522 X |
| 4,178,977 | 12/1979 | Sur et al. | 150/154 X |
| 4,375,111 | 3/1983 | Hall | 383/3 X |
| 4,651,360 | 3/1987 | Wang | 383/3 X |
| 5,000,318 | 3/1991 | Kupersmit | 206/522 X |
| 5,147,713 | 9/1992 | Dalbec et al. | 150/166 X |
| 5,193,677 | 3/1993 | Moreno | 206/522 X |

*Primary Examiner*—Allan N. Shoap
*Assistant Examiner*—Christopher J. McDonald
*Attorney, Agent, or Firm*—Thomas C. Street; David W. Smith

[57] ABSTRACT

An inflatable rubber air chamber is bonded to a rubber blanket. The inflatable rubber air chamber is inflated through an inflation tube. When inflated, a six inch cushion of air is created inside the air chamber. A cotton liner is bonded to the underside of the rubber blanket. All components could be bonded and sealed by rubber cement. The device could be custom made to fit the particular year, make and model of the vehicle.

2 Claims, 3 Drawing Sheets

HAIL INHIBITING BLANKET

BACKGROUND OF THE INVENTION

1. Field of the Invention

The present invention relates to a device for protecting automobiles, aircraft, boats and other vehicles from the catastrophic effects of a hail storm. More specifically, the present invention relates to an inflatable rubber air chamber bonded to a rubber blanket used to protect any metal, glass or plastic surface from falling pellets or balls of ice under one pound.

2. Prior Art

The effects of a hail storm can cause unrepairable damage to an automobile. Thus, a hail storm can cost car dealers and insurance companies millions of dollars. These effects are felt across the nation in higher insurance premiums and higher prices for automobiles. These effects are also felt by private citizens who do not have comprehensive insurance and must pay out of their own pockets to repair the thousands of dollars worth of damage a single hail storm can do to an automobile.

Ordinary tarpaulins and car covers used to protect automobiles from the effects of sun, rain and snow are currently utilized in many areas.

No device is known, however, for protecting an automobile from the catastrophic effects of a hail storm utilizing an inflatable rubber air chamber bonded to a rubber blanket.

SUMMARY OF THE INVENTION

The principal object of the present invention is to provide a device for use in protecting domestic and commercial vehicles from the catastrophic effects of a hail storm.

It is also an object of the present invention to provide such a device in a form that can be applied and removed quickly and easily.

Another object is to provide such a device which is of simple, inexpensive construction.

A further object is to provide such a device which, in use, can save insurance companies millions of dollars and lower insurance rates across the nation.

The foregoing objects can be accomplished by providing an inflatable rubber air chamber bonded to a rubber blanket which, in use, can be placed over an automobile, aircraft, boat or other vehicle. The device consists of an inflatable rubber air chamber which, in use, can cover the top of a particular vehicle. One rubber blanket which, in use, can cover the entire vehicle. One cotton liner covering the underside of the rubber blanket. All components are bonded and sealed by rubber cement. Once this device is in place on a particular vehicle, the air chamber can be inflated and deflated through one inflation tube.

DETAILED DESCRIPTION OF THE DRAWINGS

Figure 1:
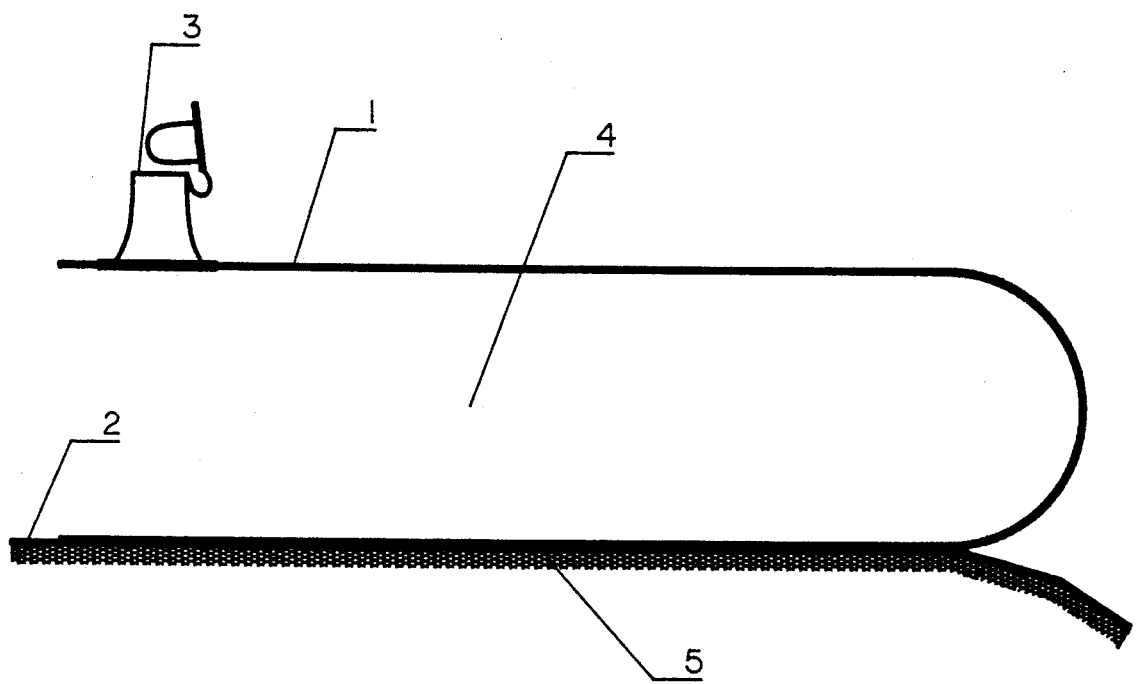
FIG. 1 is a clip section perspective of an inflatable rubber air chamber with a rubber blanket bonded to its underside with a cotton liner bonded to the underside of the rubber blanket.

As show in the drawings, the preferred hail inhibiting blanket consists of one inflatable rubber air chamber. One rubber blanket custom made to fit the particular year, make and model of the vehicle. One inflation tube with stopper. One cotton liner. All components are bonded and sealed by rubber cement.

As shown in FIG. 1, inflatable rubber air chamber labelled 1 is bonded to rubber blanket labelled 2. Air chamber 1 is inflated through inflation tube labelled 3. Inflation tube 3 is bonded to air chamber 1 by rubber cement. When inflated, a six inch cushion of air labelled 4 is created inside air chamber 1. A cotton liner labelled 5 is bonded to the underside of rubber blanket 2. All components are bonded and sealed by rubber cement.

Figure 2:
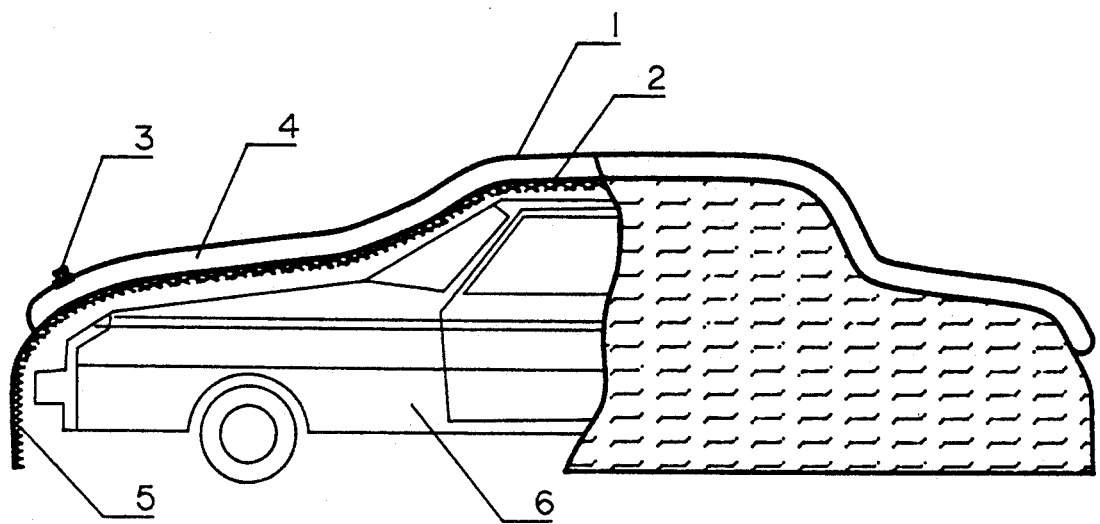
FIG. 2 is a side clip section perspective of the blanket covering an automobile. The blanket has its air chamber inflated and is ready to protect the vehicle from a hail storm.

As shown in FIG. 2, the device is applied to automobile labelled 6. The inflatable rubber air chamber labelled 1 is inflated creating a six inch cushion of air labelled 4 protecting automobile 6 against a hail storm. A cotton liner labelled 5 protects automobile 6 against being rubbed by the underside of rubber blanket labelled 2.

Figure 3:
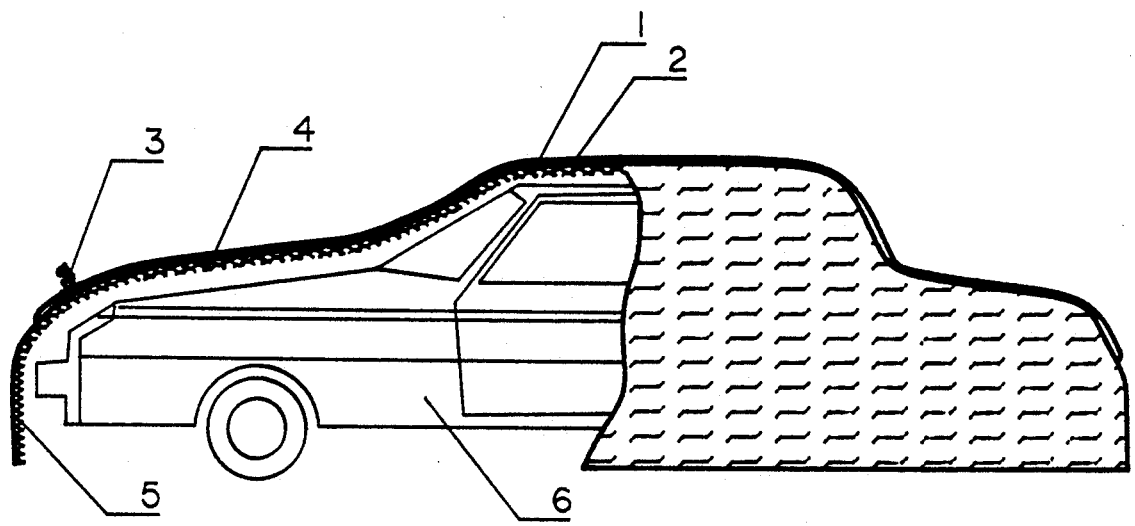
FIG. 3 is a side clip section perspective of the blanket covering an automobile. The blanket has its air chamber deflated and in this stage serves an ordinary cover that can be applied and removed quickly and easily.

As shown in FIG. 3, the device is applied to automobile labelled 6. The inflatable rubber air chamber labelled 1 is deflated and in this stage the device serves as an ordinary cover that can be applied and removed quickly and easily.

The lightweight rubber construction utilizing the inflatable rubber air chamber of the device will allow for quick application and removal and for a waterproof, weather resistant device. For use on a small imported car for example, the rubber blanket could be ⅛ inch in thickness and could be 132 inches wide by 240 inches long. The air chamber could be made of the same ⅛ inch rubber and could be 54 inches wide by 168 inches long and could be bonded to the rubber blanket by rubber cement. The cotton liner could be ⅛ inch in thickness and could be 132 inches wide by 240 inches long and could be bonded to the underside of the rubber blanket by rubber cement. The air chamber could be inflated and deflated through a flexible plastic inflation tube with a stopper. The inflation tube could be bonded to the air chamber by rubber cement. The device could be custom made to fit the particular year, make and model of the vehicle. All components could be bonded and sealed by rubber cement.

We claim:

1. An automobile cover comprising;
   a) a rubber sheet having a top side, a bottom side and side edges, said sheet sized to cover the top and sides of an automobile;
   b) a cloth liner bonded to the bottom side of the rubber sheet and substantially corresponding in size to said sheet;
   c) an inflatable chamber having side edges bonded to the top side of the rubber sheet, said chamber sized to cover the surfaces of an automobile facing generally upward.

2. A car cover as in claim 1 wherein the side edges of the inflatable chamber are spaced from the side edges of the rubber sheet.

* * * * *